United States Patent [19]

Woike et al.

[11] Patent Number: 5,016,992
[45] Date of Patent: May 21, 1991

[54] METHOD OF AND APPARATUS FOR THE READING OF MAGNETICALLY STORED INFORMATION

[75] Inventors: Theo Woike, Cologne; Detlef Kerkmann, Jülich; Thomas Beier, Hürth; Wolfgang Krasser; Danilo Pescia, both of Jülich, all of Fed. Rep. of Germany

[73] Assignee: Forschungszentrum Julich GmbH, Julich, Fed. Rep. of Germany

[21] Appl. No.: 493,129

[22] Filed: Mar. 13, 1990

[30] Foreign Application Priority Data

Mar. 16, 1989 [DE] Fed. Rep. of Germany ....... 3908587

[51] Int. Cl.$^5$ ............................ G02F 1/09; G11B 7/00; G11B 11/00
[52] U.S. Cl. .................... 350/376; 350/384; 365/117; 365/122; 369/110; 369/134
[58] Field of Search ............... 350/374, 375, 376, 378, 350/384; 365/117, 121, 122; 369/107, 110, 116, 134

[56] References Cited

U.S. PATENT DOCUMENTS

| | | | |
|---|---|---|---|
| 3,491,351 | 1/1970 | Smaller et al. | 365/122 |
| 4,160,270 | 7/1979 | Goldschmidt et al. | 369/110 |
| 4,562,568 | 12/1985 | Hazel et al. | 369/110 |
| 4,683,421 | 7/1987 | Miller et al. | 350/376 |
| 4,774,615 | 9/1988 | Revelli et al. | 369/110 |
| 4,924,454 | 5/1990 | Baas | 369/107 |

Primary Examiner—Bruce Y. Arnold
Assistant Examiner—Martin Lerner
Attorney, Agent, or Firm—Herbert Dubno

[57] ABSTRACT

A magnetic storage medium is read by incident polarized light and reflected outgoing light defining a common plane. The polarized incident light preferably has a polarization vector at 40° to 50° to this plane and at the storage medium, the magnetization is in a direction perpendicular to the plane. The preamplified output signal $V_M$ from the photodiode transducing the outgoing light beam has a fixed value $V_O$ subtracted therefrom where $V_O$ is a function of the sensitivity and resolving power of the electronic circuitry. The signal $V_M-V_O$ is then amplified and processed to represent the stored data.

20 Claims, 5 Drawing Sheets

METHOD OF AND APPARATUS FOR THE READING OF MAGNETICALLY STORED INFORMATION

FIELD OF THE INVENTION

Our present invention relates to a method of and to an apparatus for the reading of stored information and, more particularly, to the reading of information stored in the form of oriented electromagnetic remanent fields in a storage medium, generally a ferromagnetic or ferroelectric storage medium.

More specifically the invention relates to a method of and to an apparatus for the reading of magnetically stored information using optical means.

BACKGROUND OF THE INVENTION

A method for reading magnetically stored information, especially information stored in a binary system, from a magneto-optical or optoelectronic storage medium can use a light beam directed upon the storage medium and either reflected thereby or transmitted therethrough.

A light beam coming from the storage medium and either a reflected light beam or a transmitted light beam (hereinafter the outgoing light beam) is received by an optoelectric detector, especially a photodiode which transduces the outgoing light beam into an electrical signal $V_M$.

The acceptable range for $V_M$ is a voltage larger than 0 but smaller than the working voltage of the electronic circuit (typically 10 V, as determined by the amplifiers). In the case that the voltage that can be handled by the electronic components is larger than 10 V, then the upper limit for $V_M$ is given by this larger voltage.

This electrical signal can be processed by an electronic circuit which can include a preamplifier, an amplifier and a data processing system so that the magnetically stored information can be converted into electronic data and processed in the usual manner with binary or like coded stored information.

An apparatus for this purpose generally comprises a light source from which the incident beam derives, a magneto-optical or optoelectronic storage medium, the light/electric detector or transducer and an electronic circuit supplied by the transducer and outputting the electronic pulses representing the stored information. The electronic circuit can include a preamplifier, a compensator for modifying the preamplified signal, a main amplifier for amplifying the modified signal, and the data processing system transforming the amplified signal into corresponding electronic pulses representing the stored data.

The storage medium is usually a layer system with appropriate magnetic characteristics and which can be used as magnetic storage in the digital information processing art, the magnetic layer being applied to a nonmagnetic carrier. Typical layers can have thicknesses of the order of $1 \times 10^{-6}$ m and even thinner layers can be used with thicknesses as low as $1 \times 10^{-10}$ m. However, there are no limits for the maximum thickness which can be detected Reference may be had in this regard to J. G. Gay, R. Richter, J. Appl. Phys. 61, 3362 (1987) and F. J. A. den Broeder et al., Phys. Rev. Lett 60, 2769 (1988). The storage process in such a layer storage medium requires that the storage medium be transformable into two different magnetic states which, for convenience below will be referred to as the +1 and −1 states.

The switchover between these two magnetic states is generally due to a small externally applied magnetic field H. The so-called magnetic memory of the storage medium is reflected in the fact that a particular applied magnetic state will remain or be retained even when the external magnetic field H is removed.

The magnetic state of the stored medium can be described as a remanant magnetization M and is, in effect, a retained electromagnetic field of a particular orientation The states +1 and −1 represent, therefore, the possible saturation values of the magnetization of the storage medium and can represent polarization in two opposite directions.

The property of the magnetization M of a storage medium as a function of the externally applied magnetic field H, is described by the so-called hysteresis curve. The knowledge of the form of the hysteresis curve enables a determination of the so-called coercivity field $H_C$ at which the magnetization can be switched over from the state +1 to the state −1 and vice versa and the determination of the so-called remanence, i.e. the residual magnetization for an applied magnetic field H=O.

For maximum storage density of the medium, the value $H_C$ should be optimized and, as a consequence, the dimensions of the domains which can assume the magnetic states +1 or −1 independently from one another should be minimized. The knowledge of the hysteresis curve, therefore, allows a quality control of the fabrication of the storage medium.

It is also known in the art to provide a process for reading magnetically stored information based upon the so-called magneto-optical Kerr effect.

In accordance with this phenomenon, the intensity and polarization of the light reflected or transmitted from a specimen are affected by the magnetic state of the specimen. This is based upon the physical effect on an elementary optical process, for example, reflection because of the influence of the magnetization M of the storage medium on the Kerr effect thereof.

State of the art apparatus for utilizing this process in reading magnetically stored information can be very complicated and bulky. The process itself is rather complex.

German patent document 29 53 304 (col. 4, lines 17–19) describes a device for reading magnetically stored information in which the light beam outputted by the light source is elliptically polarized. German patent document 21 2 1 510 (col. 1, lines 10–20) describes an apparatus for reading a binary information storage utilizing the Kerr effect in which a magnetic mirror is arranged in the path of the light beam from the storage layer and comprises a ferromagnetic metal. In addition, an arrangement is proposed in which the ferromagnetic metal of the mirror can be brought to magnetic saturation in at least one of the magnetization directions to correspond to a value of a binary digit in the storage layer.

These state of the art processes are not only very complicated but they also require complex equipment which can be bulky. In addition they are frequently characterized by the drawback that they do not have a sufficient sensitivity with respect to determination of the hysteresis curve of the storage medium especially when very thin layers in the range of $10^{-10}$ m, or so-called monolayers, are involved.

OBJECTS OF THE INVENTION

It is therefore an object of the invention to provide a process for reading magnetically stored information, especially information stored in a binary form, which is simple and of high sensitivity, especially for storage layers of relatively small layer thicknesses down to monolayer thicknesses.

Another object of the invention is to provide an apparatus for the purposes described which is more effective and less bulky than earlier apparatus for the reading of a storage medium.

SUMMARY OF THE INVENTION

According to the invention, the information stored in the storage medium is stored in the form of an electromagnetic field having a field direction which is perpendicular to the reflection plane, i.e. a common plane of the incident beam and the reflected or transmitted beam, i.e. the outgoing beam, while the electrical signal $V_M$ from the detector is reduced by a fixed value $V_O$ to form a reduced signal $V_M-V_O$ which is electronically amplified.

The method of the invention can then comprise the steps of:

(a) providing a storage medium having information stored in a form of residual electromagnetic fields oriented in a particular direction;

(b) directing against the storage medium in regions thereof having information stored in the form of the residual electromagnetic fields oriented in the direction perpendicular to the direction of the incident beam, and generating an outgoing light beam from the storage medium coplanar with the incident light beam and perpendicular to the direction of the residual electromagnetic field in a respective region thereof;

(c) detecting the outgoing light beam and transducing the outgoing light beam into an electrical signal $V_M$ of an amplitude which is a function of the intensity;

(d) subtracting from the electrical signal $V_M$ a fixed value $V_O$ determined by a sensitivity of a signal processor for the information to form a reduced signal $V_M-V_O$;

(e) electronically amplifying the reduced signal $V_M-V_O$ to produce an amplified reduced signal $N(V_M-V_O)$, where N is an amplification factor; and (f) thereafter processing the amplified reduced signal $N(V_M-V_O)$ in the signal processor.

In apparatus aspects, therefore, the apparatus for reading the storage medium can comprise:

a light source for directing against the storage medium in regions thereof having information stored in the form of the residual electromagnetic fields oriented in the direction an incident light beam perpendicular to the direction, thereby generating an outgoing light beam from the storage medium coplanar with the incident light beam and perpendicular to the orientation of the residual electromagnetic field in a respective region thereof;

an optoelectric detector in the path of the outgoing beam for detecting the outgoing light beam in a common plane of the light beams perpendicular to the direction and transducing the outgoing light beam into an output signal; and electric circuit means including:

a preamplifier connected to the detector for preamplifying an output signal thereof and producing an electrical signal $V_M$ of an amplitude which is a function of the intensity, a compensator for subtracting from the electrical signal $V_M$ a fixed value $V_0$ determined by a sensitivity of a signal processor or the information to form a reduced signal $V_M-V_O$, an amplifier connected to the compensator for electronically amplifying the reduced signal $V_M-V_0$ to produce an amplified reduced signal $N(V_M-V_O)$, where N is an amplification factor, and means for applying the amplified reduced signal $N(V_M-V_O)$ to the signal processor.

As will be discussed in greater detail below, it is advantageous to provide a polarizer and absorber in the path of the outgoing light beam between the storage medium and the detector to absorb all outgoing components with the exception of those which contribute to the signal which represents the magnetized state of the storage medium and hence the stored information. Consequently, the apparatus for reading the storage medium can comprise: a light source for directing against the storage medium in regions thereof having information stored in the form of the residual electromagnetic fields oriented in the direction an incident light beam perpendicular to the direction, thereby generating an outgoing light beam from the storage medium coplanar with the incident light beam and perpendicular to the orientation of the residual electromagnetic field in a respective region thereof;

an optoelectric detector in the path of the outgoing beam for detecting the outgoing light beam in a common plane of the light beams perpendicular to the direction and transducing the outgoing light beam into an output signal;

electric circuit means including:

a preamplifier connected to the detector for preamplifying an output signal thereof and producing an electrical signal $V_M$ of an amplitude which is a function of the intensity, a compensator for modifying the electrical signal $V_M$ to produce an output signal, an amplifier connected to the compensator for electronically amplifying the output signal to produce an amplified output signal, and a signal processor connected to the amplifier for evaluating the information; and a polarizer between the storage medium and the detector in the path so positioned as to intercept all light ray components from the storage medium except those which contribute to evaluation of the stored information.

In the process of the invention, therefore, the stored information which is used is the remanent field which has a direction perpendicular to the aforementioned plane and, in addition, the electrical signal $V_M$ of the detector generated by the intercepted light beam outgoing from the storage medium is reduced by a fixed value $V_O$ to produce the reduced signal $V_M-V_O$ prior to the amplification.

The value $V_O$ will depend upon the maximum voltage accepted by the circuitry downstream of the detector.

The reduced signal then represents the stored information of the storage medium perpendicular to the reflection plane and this information, after amplification, can be processed into electronic pulses signaling the information.

The invention uses the so-called transverse geometry of the magneto-optical Kerr effect to provide a reduced signal which completely represents the magnetic state of the sampled storage medium at the location at which the light beam is incident thereon as long as the state is represented by a magnetization component which is perpendicular to the plane defined by the incident and outgoing beam, e.g. the incident beam and the reflected light beam.

By contrast with state of the art techniques, additional process steps required in the state of the art to ascertain the hysteresis of the storage medium with high sensitivity can be obviated.

The change in the magnetic state M of the storage medium resulting, for example, by variation of the magnetic field H results in a change in intensity of the light beam and hence in the electrical signal $V_M$ which is transduced therefrom. This electrical signal can be very small.

In the case of a storage medium of monolayer thickness, the value $(V_M-V_O)/V_O$ can be $10^{-4}$ and it is indeed surprising that it is possible to reduce the value $V_M$ by the fixed value $V_O$ and then amplify the resulting reduced signal to provide an accurate picture of the state of the magnetization of the storage medium.

The value $V_O$ is thus so selected that the variation in the electrical signal $V_M$ resulting from variation in the magnetic field H can be detected.

Preferably the fixed value $V_O$, within a tolerance range $V_T$, can be selected as the mean value of the extreme fluctuations of the signal $V_M$. The extreme fluctuations can thus be detected in $V_M$ from different magnetic states or magnetized regions of the storage medium in the form of changes in the light intensity of the light beam outgoing from the storage medium.

The tolerance range $V_T$ of the value $V_O$ is given by the inequality:

$$\frac{V_T}{V_O} < \frac{A}{V_S} \cdot \frac{(V_M - V_O)}{V_O}$$

In this inequality, A represents the maximum working signal of the electronics while $V_S$ represents the desired signal level.

In a particularly advantageous embodiment of the method of the invention, the storage medium which is used has the magnetic information which is stored therein in the form of a singular magnetization orientation or the opposite magnetization orientation. It is thus possible to position the storage medium so that the singular orientation is perpendicular to both the incident light beam and the outgoing light beam.

This storage medium is thus in the class of binary storage media which can be used for electronic data processing and in which the magnetic information is stored in portions of the magnetic layer system by magnetizations with parallel or antiparallel orientation. In the method of the invention utilizing the aforementioned positioning of the storage medium, all of the information stored in the storage medium can be read out with ease.

It has been found to be advantageous to employ a layer-shaped storage medium of ferromagnetic or ferroelectric material and a layer thickness in the range of $1 \times 10^{-10}$ m to $0.5 \times 10^{-6}$ m and preferably a layer thickness of at least the order of several (e.g. 3)$\times 10^{-10}$ m. Best results are obtained with a storage medium in which the layer thickness is in the range of a monolayer since this allows the storage of information in the most closely packed way.

In an especially advantageous application of the process of the invention, a polarizer is provided between the storage medium and the detector, e.g. the photodiode, for absorbing the components of the light beam coming from the storage medium which do not affect the information contained in the light beam as to the magnetic state of the storage media. The polarizer as indicated, is disposed between the storage medium and the detector along the optical path of the outgoing light beam.

In this arrangement, the selective reduction of the signal $V_M$ described above has proved to be particularly important. By using a linear polarizer it is possible to practically eliminate from the outgoing light beam all light components which are not influenced by a change in the magnetization M of the storage medium.

Preferably the light beam serving as the incident beam is a linearly polarized light beam. It has been found to be advantageous to provide the polarization vector of the incident linearly polarized light beam so that it includes an angle with the reflection plane between 40° and 50° and preferably is about 45°.

It should be clear from the foregoing that the references to the magnetization M and the externally applied magnetic field H are intended to relate to a storage medium of ferromagnetic material.

To the extent that the storage medium is composed of a ferroelectric material, the parameters will, of course, be properly redefined. Thus the value M will represent the residual electrical polarization while H will represent the externally applied electric field. The term "electromagnetic field," of course, is used to refer to the residual polarization whether it is a magnetic polarization or an electrical polarization.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
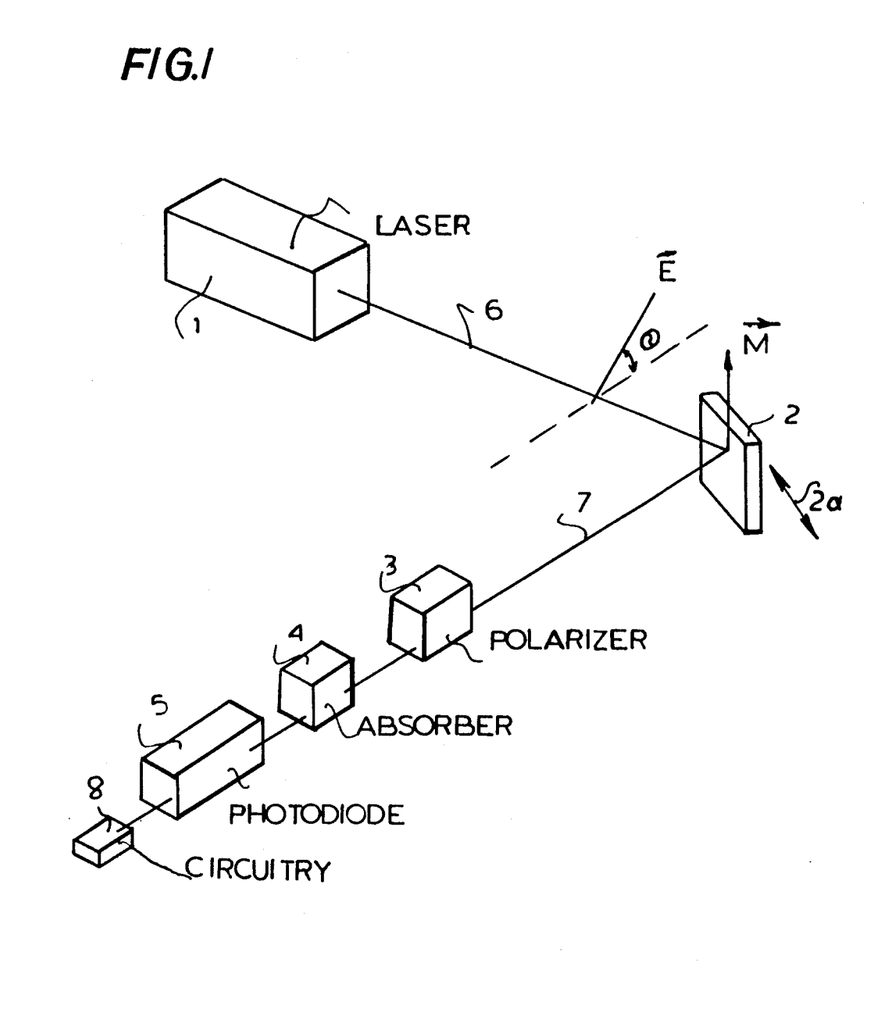
FIG. 1 is a diagram of an apparatus for reading magnetically stored information utilizing a reflected mode according to the invention.

The apparatus shown in FIG. 1 for reading a magnetic storage medium 2 which can be a tape or strip movable in the direction of arrow 2 comprises a layer 1 directing an incident beam 6 against the magneto-optical storage medium 2. A polarizer 3 is provided in the path of the outgoing reflected light beam 7 upstream of an absorber 4 and a photodiode 5 forming the detector. The electronic circuitry connected to the photodiode 5 is represented at 8.

With this apparatus, use is made of the so-called transverse geometry of the magneto=optical Kerr effect in which the outgoing light beam 7 reflected from the storage medium 2 will have an amplitude which is a function of the magnetization state M in the region of impingement of the incident light beam.

For further processing of the electric signal $V_M$ derived from the photodiode, representing, of course, the intensity of the reflected light, the circuit 8 comprises (FIG. 2) a preamplifier 9 followed by a compensator 10 which may be in the form of an addition circuit adding the value $-V_O$ to the inputted value $V_M$. The compensator 10 has its output signal $V_M-V_O$ which is applied to the input of a main amplifier 11 with an amplification factor N. The output $N(V_M-V_O)$ is applied to the data processor 12, e.g. a computer as digital information representing the stored information.

Figure 3:
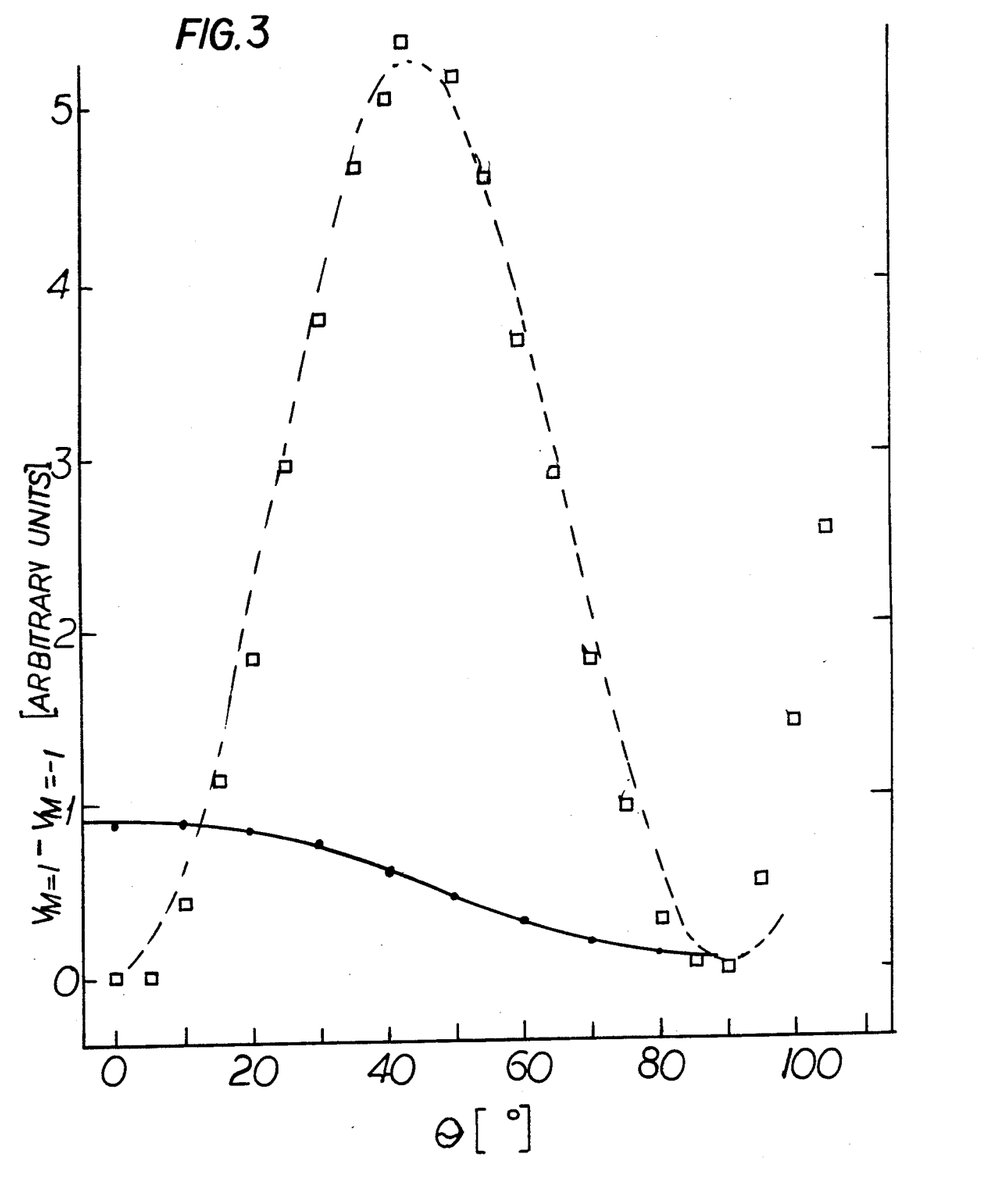
FIG. 3 is a graph of the extreme fluctuations in which the angle of the polarization vector to the reflection plane is represented along the abscissa and the difference $V_{M=1} - V_{M=-1}$ is represented in arbitrary units along the ordinate.

FIG. 3 shows the extreme fluctuations by way of comparison The signal $V_{M=1}-V_{M=-1}$ in arbitrary units is here plotted as a function of the angle of the polarization vector E included with the reflection plane defined by the incident beam 6 from the laser 1 and the reflected beam 7 from the storage medium 2.

The plot represented by the data points indicated at circles is the result without the polarizer 3. The plot of data points represented by the squares is that obtained with the polarizer 3. The measuring points represented by circles are the mean values of 20 M(H) operations. The points represented by squares are the results of a single measurement.

Figure 4:
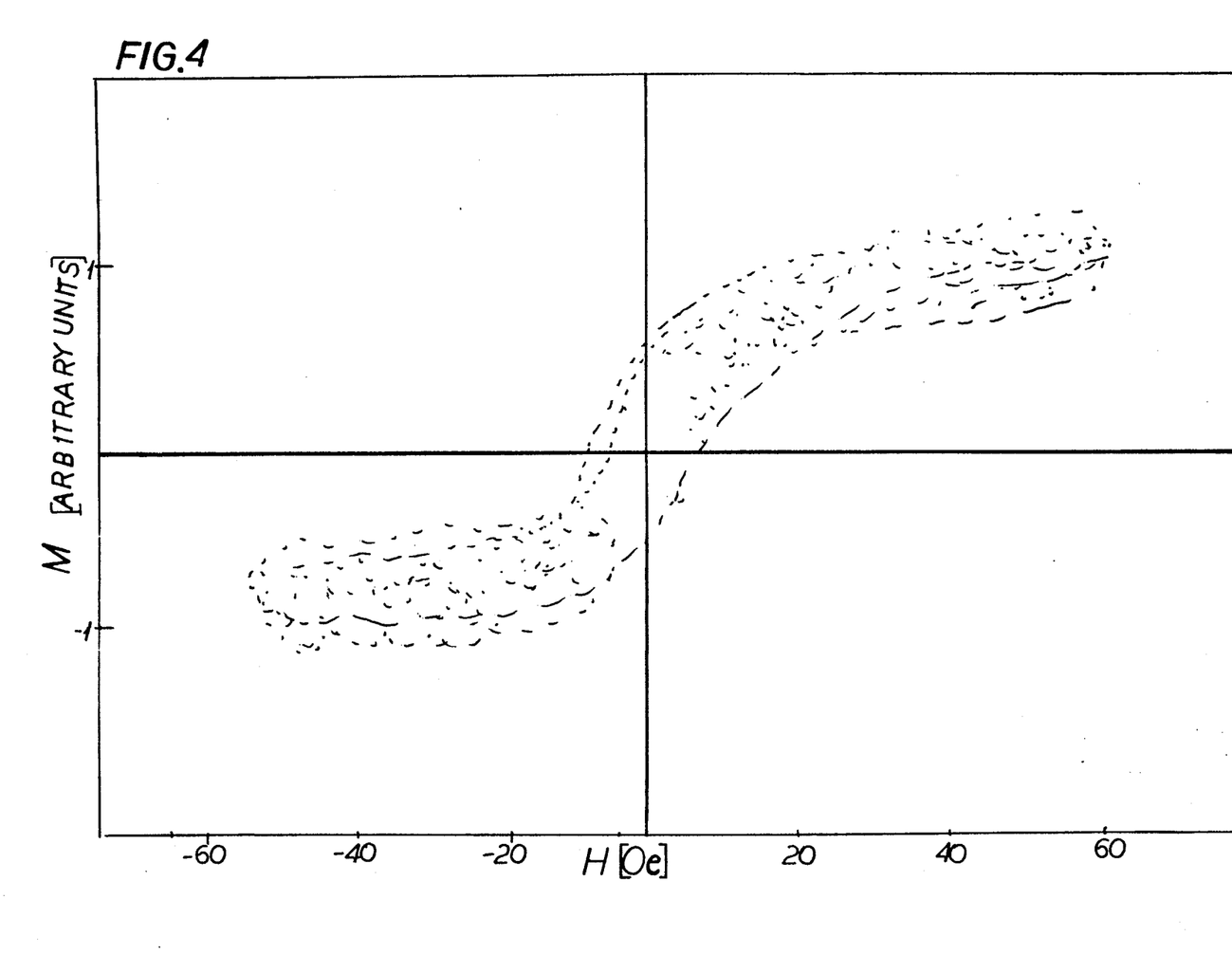
FIG. 4 is a graph of the magnetization plotted along the ordinate in arbitrary units as a function applied magnetic field H (plotted along the abscissa in Oersted for a monolayer of cobalt on a Cu (100) surface)

In FIG. 4 the value M is plotted along the ordinate in arbitrary units against H in Oersted plotted along the abscissa for a monolayer of cobalt on a Cu (100) surface. To avoid contamination during the measurements taken in art, the cobalt layer was protected by an additional copper layer of the thickness of $5 \times 10^{-9}$ m. The illustrated measurements points are mean values of 20 complete M(H) runs. The duration for determination of a M(H) run was about 0.5 sec.

Figure 2:
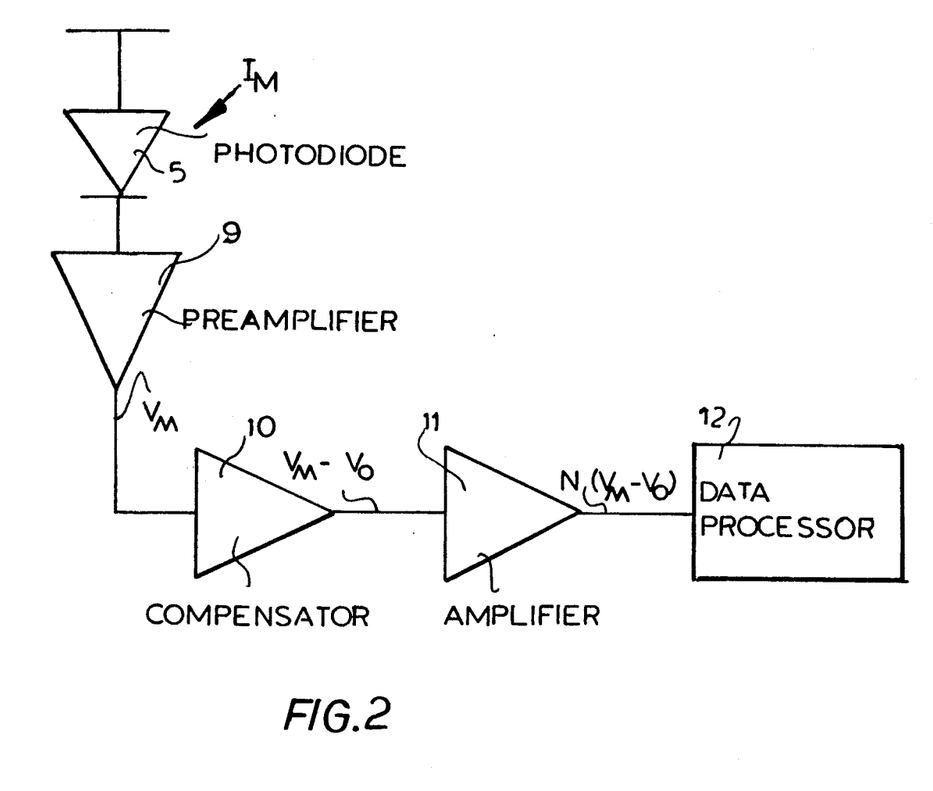
FIG. 2 is a block diagram of the measurement electronics of the system of FIG. 1.
Figure 5:
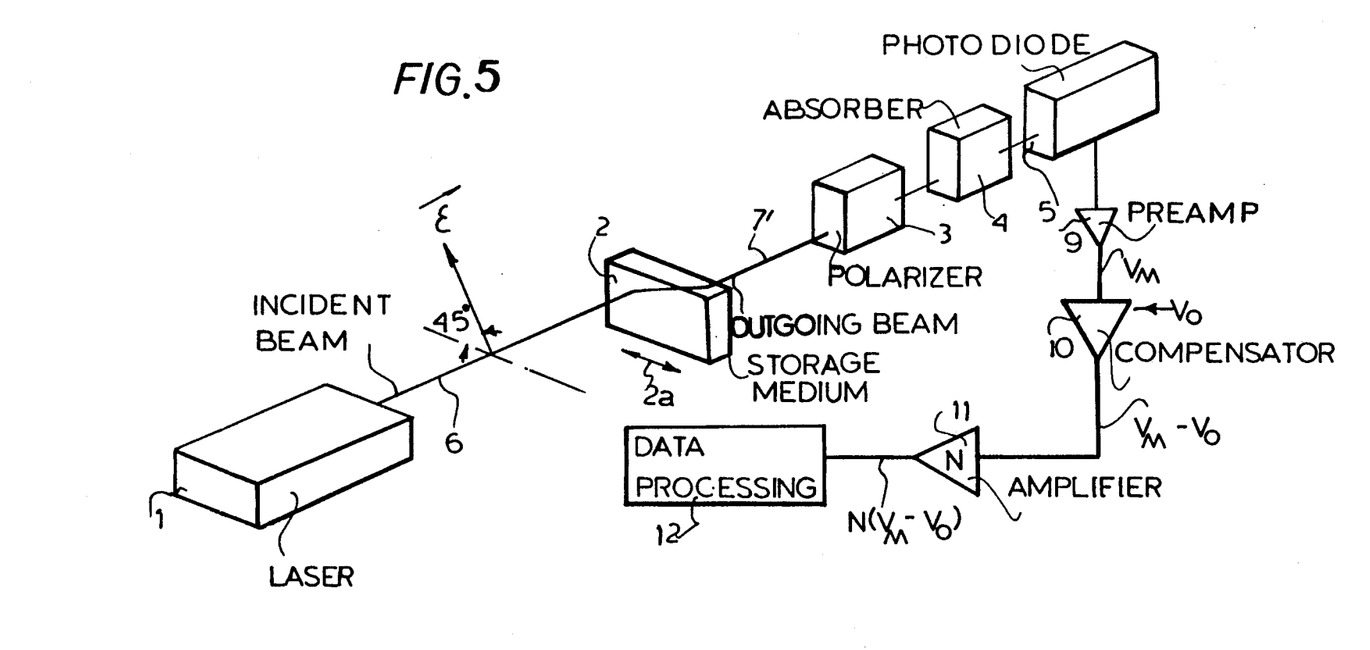
FIG. 5 is a diagram similar to FIGS. 1 and 2 showing an apparatus utilizing transmitted light.

FIG. 5 shows a system generally similar to that illustrated in FIGS. 1 and 2 in which similar parts have been identified with similar reference numerals, except that the outgoing beam 7' is a transmitted beam from the storage medium 2. The latter can be moved in the direction of the arrow 2a.

Essentially this system operates in the same manner as the system of FIGS. 1 and 2.

We claim:

1. A method of reading stored information, especially binary information, comprising the steps of:
   (a) providing a storage medium having information stored in a form of residual electromagnetic fields oriented in a particular direction;
   (b) directing against said storage medium in regions thereof having information stored in the form of said residual electromagnetic fields oriented in said direction an incident light beam perpendicular to said direction, and generating an outgoing light beam from said storage medium coplanar with said incident light beam and perpendicular to said direction of the residual electromagnetic field in a respective region thereof;
   (c) detecting said outgoing light beam in a common plane of said light beams perpendicular to said direction and transducing said outgoing light beam into an electrical signal $V_M$ of an amplitude which is a function of said intensity;
   (d) subtracting from said electrical signal $V_M$ a fixed value $V_O$ determined by the maximum working voltage of the signal processor for said information to form a reduced signal $V_M-V_O$;
   (e) electronically amplifying said reduced signal $V_M-V_O$ to produce an amplified reduced signal $N(V_M-V_O)$, where N is an amplification factor; and
   (f) thereafter processing said amplified reduced signal $N(V_M-V_O)$ in said signal processor.

2. The method defined in claim 1 wherein said information is stored in the form of residual magnetic fields M and said storage medium is a ferromagnetic material which is subjected to an external magnetic field H for storage of the information.

3. The method defined in claim 1 wherein said information is stored in the form of residual electric fields and said storage medium is a ferroelectric material which is subjected to an external electrical field for storage of the information.

4. The method defined in claim 1 wherein said outgoing beam is reflected from said storage medium.

5. The method defined in claim 1 wherein said outgoing beam is transmitted through said storage medium.

6. The method defined in claim 1 wherein said fixed value $V_O$ is a mean value, within a tolerance range $V_T$, of extreme fluctuations of said signal $V_M$ resulting from fluctuations in light intensity of different magnetized regions of said storage medium, and said subtracting in step (d) is effected in an electronic circuit, further comprising the step of storing said fixed value $V_O$ in said circuit.

7. The method defined in claim 6 wherein said tolerance range $V_T$ is determined based upon the relation:

$$\frac{V_T}{V_O} < \frac{A}{V_S} \cdot \frac{(V_M - V_O)}{V_O}$$

where A is a maximum level of a signal processable by electronics for effecting steps (d) and (e), and $V_S$ is a desired signal level for the signal processor of step (f).

8. The method defined in claim 1 wherein said storage medium has all of the information stored therein stored in the form of a first direction of magnetization and a second direction of magnetization opposite said first direction and said storage medium is positioned in step (b) so that both of said light beams are perpendicular to both said first and said second directions.

9. The method defined in claim 1 wherein said storage medium is a layer of a ferromagnetic or a ferroelectric material with a layer thickness of substantially $1 \times 10^{-10}$ m to typically $0.5 \times 10^{-6}$ m.

10. The method defined in claim 9 wherein said storage medium has a layer thickness of at least $1 \times 10^{-10}$ m.

11. The method defined in claim 9 wherein said storage medium is a monolayer.

12. The method defined in claim 1, further comprising the step of interposing in a path of said outgoing light beam between said storage medium and detection thereof in step (c) a polarizer so positioned as to intercept all light ray components from said storage medium except those which contribute to evaluation of the stored information.

13. The method defined in claim 1 wherein said incident light beam is composed of linearly polarized light.

14. The method defined in claim 13 wherein said incident light beam has a polarization with a polarization vector including an angle of substantially 40° to 50° with said plane.

15. The method defined in claim 14 wherein said angle is 45°.

16. An apparatus for reading stored information, especially binary information, on a storage medium having information stored in a form of residual electromagnetic fields oriented in a particular direction, said apparatus comprising:

a light source for directing against said storage medium in regions thereof having information stored in the form of said residual electromagnetic fields oriented in said direction an incident light beam perpendicular to said direction, thereby generating an outgoing light beam from said storage medium coplanar with said incident light beam and perpendicular to said direction of the residual electromagnetic field in a respective region thereof;

an optoelectric detector in the path of said outgoing beam for detecting said outgoing light beam in a common plane of said light beams perpendicular to said direction and transducing said outgoing light beam into an output signal; and electric circuit means including:

a preamplifier connected to said detector for preamplifying an output signal thereof and producing an electrical signal $V_M$ of an amplitude which is a function of said intensity, a compensator for subtracting from said electrical signal $V_M$ a fixed value $V_O$ determined by a sensitivity of a signal processor for said information to signal $V_M$-$V_O$, an amplifier connected to said compensator for electronically amplifying said reduced signal $V_M$-$V_O$ to produce an amplified reduced signal $N(V_M$-$V_O)$, where N is an amplification factor, and means for applying said amplified reduced signal $N(V_M$-$V_O)$ to said signal processor.

17. The apparatus defined in claim 16 wherein said storage medium is a layer of a ferromagnetic or a ferroelectric material with a layer thickness of substantially $1 \times 10^{-10}$ m to typically $0.5 \times 10^{-6}$ m.

18. The apparatus defined in claim 16 wherein said storage medium is a layer of a ferromagnetic or a ferroelectric material with a layer thickness of substantially $1 \times 10^{-10}$ m to typically $0.5 \times 10^{-6}$ m.

19. The apparatus defined in claim 16 wherein said source is a linearly polarized light source so selected that said incident light beam has a polarization with a polarization vector including an angle of substantially 40° to 50° with said plane.

20. An apparatus for reading stored information, especially binary information, on a storage medium having information stored in a form of residual electromagnetic fields oriented in a particular direction, said apparatus comprising:

a light source for directing against said storage medium in regions thereof having information stored in the form of said residual electromagnetic fields oriented in said direction an incident light beam perpendicular to said direction, thereby generating an outgoing light beam from said storage medium coplanar with said incident light beam and perpendicular to said direction of the residual electromagnetic field in a respective region thereof;

an optoelectric detector in the path of said outgoing beam for detecting said outgoing light beam in a common plane of said light beams perpendicular to said direction and transducing said outgoing light beam into an output signal;

electric circuit means including:

a preamplifier connected to said detector for preamplifying an output signal thereof and producing an electrical signal $V_M$ of an amplitude which is a function of said intensity, a compensator for modifying said electrical signal $V_M$ to produce an output signal, an amplifier connected to said compensator for electronically amplifying said output signal to produce an amplified output signal, and a signal processor connected to said amplifier for evaluating said information; and a polarizer between said storage medium and said detector in said path so positioned as to intercept all light ray components from said storage medium except those which contribute to evaluation of the stored information.

* * * * *